(12) United States Patent
Elliott

(10) Patent No.: US 7,983,670 B1
(45) Date of Patent: Jul. 19, 2011

(54) WIRELESS FALLBACK FOR SUBSCRIBERS OF WIRELINED NETWORKS

(75) Inventor: Brig Barnum Elliott, Arlington, MA (US)

(73) Assignees: Verizon Corporate Services Group Inc., Basking Ridge, NJ (US); Raytheon BBN Technologies Corp., Cambridge, MA (US)

( * ) Notice: Subject to any disclaimer, the term of this patent is extended or adjusted under 35 U.S.C. 154(b) by 228 days.

(21) Appl. No.: 10/803,032

(22) Filed: Mar. 18, 2004

(51) Int. Cl.
H04W 24/00 (2009.01)
H04W 4/00 (2009.01)
H04B 7/15 (2006.01)
H04B 7/00 (2006.01)
H04M 3/22 (2006.01)
H04M 1/24 (2006.01)
H04M 3/08 (2006.01)
G01R 31/08 (2006.01)
G06F 11/00 (2006.01)

(52) U.S. Cl. ............ 455/426.2; 455/423; 455/11.1; 455/13.1; 455/41.2; 379/9.05; 379/16; 379/22.03; 370/216; 370/221; 370/226

(58) Field of Classification Search ............ 379/221.03, 379/9.05, 16, 22.03; 455/554.1, 426.2, 426.1, 455/11.1, 13.1, 423, 41.2, 554.2; 725/93, 725/94, 116; 370/216–228
See application file for complete search history.

(56) References Cited

U.S. PATENT DOCUMENTS

| | | | | |
|---|---|---|---|---|
| 5,751,789 A * | 5/1998 | Farris et al. | ............ | 379/34 |
| 5,790,631 A * | 8/1998 | Minarczik et al. | ............ | 379/2 |
| 6,246,750 B1 * | 6/2001 | Ehreth | ............ | 379/56.2 |
| 6,285,857 B1 * | 9/2001 | Javitt | ............ | 455/15 |
| 6,714,534 B1 * | 3/2004 | Gerszberg et al. | ............ | 370/352 |
| 6,829,486 B2 * | 12/2004 | McKenna et al. | ............ | 455/464 |
| 2002/0187746 A1 * | 12/2002 | Cheng et al. | ............ | 455/11.1 |
| 2003/0134598 A1 * | 7/2003 | Sendrowicz | ............ | 455/67.1 |
| 2004/0033779 A1 * | 2/2004 | Ochi et al. | ............ | 455/11.1 |
| 2004/0214569 A1 * | 10/2004 | Cardina et al. | ............ | 455/426.1 |
| 2005/0063333 A1 * | 3/2005 | Patron et al. | ............ | 370/329 |
| 2005/0108427 A1 * | 5/2005 | Datta | ............ | 709/238 |
| 2005/0148315 A1 * | 7/2005 | Sawada | ............ | 455/403 |
| 2007/0060202 A1 * | 3/2007 | Knight | ............ | 455/562.1 |

OTHER PUBLICATIONS

Ad-Hoc network definition, What is.com definition.*

* cited by examiner

Primary Examiner — Marisol Figueroa

(57) ABSTRACT

Techniques are disclosed for implementing wireless fallback of wireline service. Network interface units [405] may be installed in subscriber buildings in a residential or business neighborhood. The NIUs [405] may include a wireless transceiver [407] and a switch [410]. During normal operation, the switch provides the subscribers with wireline network connectivity. In the event of a local failure of the wireline connectivity, the NIUs may provide fallback network connectivity through the wireless transceiver [407], which communicates with other wireless transceivers installed at other local subscriber locations.

30 Claims, 11 Drawing Sheets

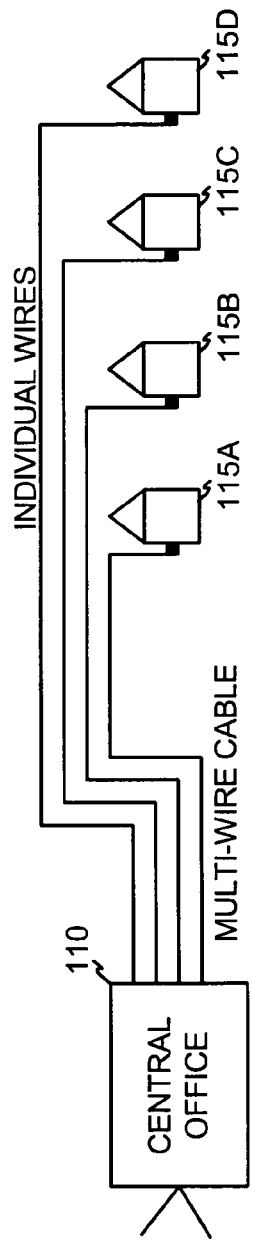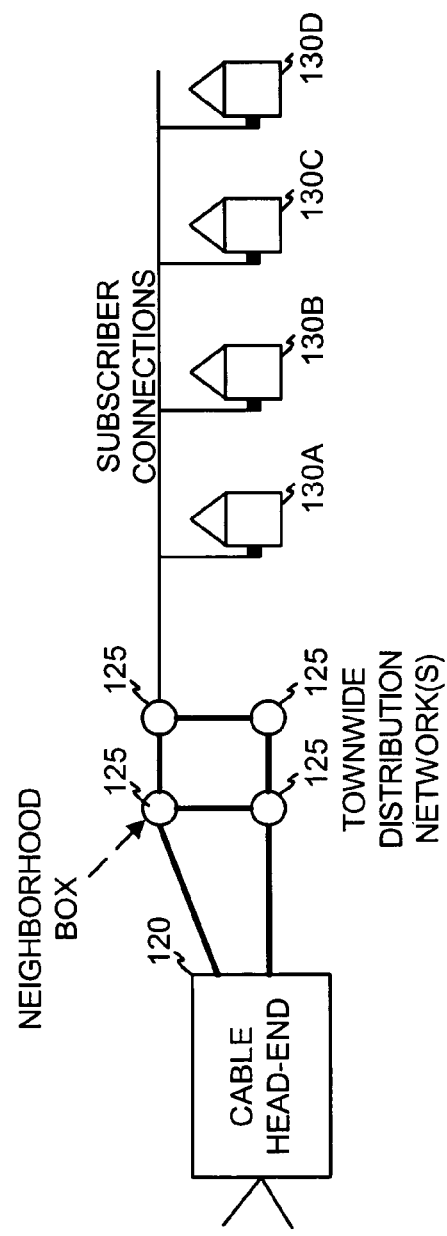

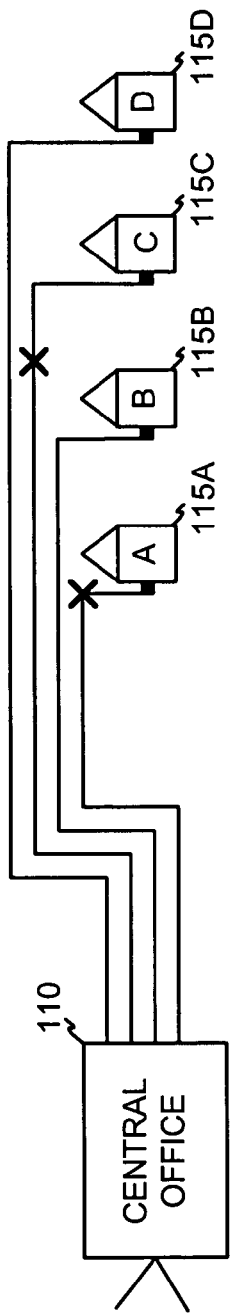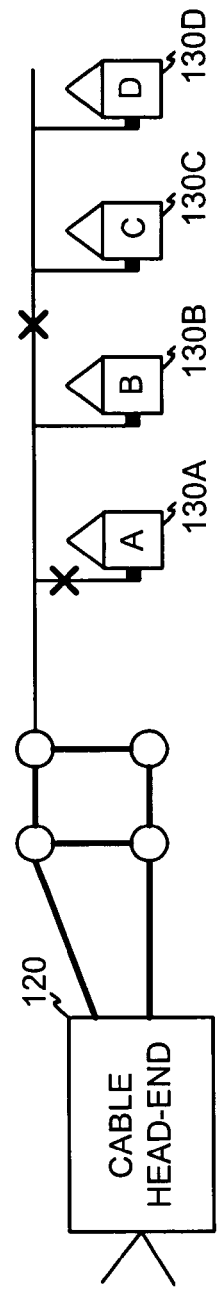

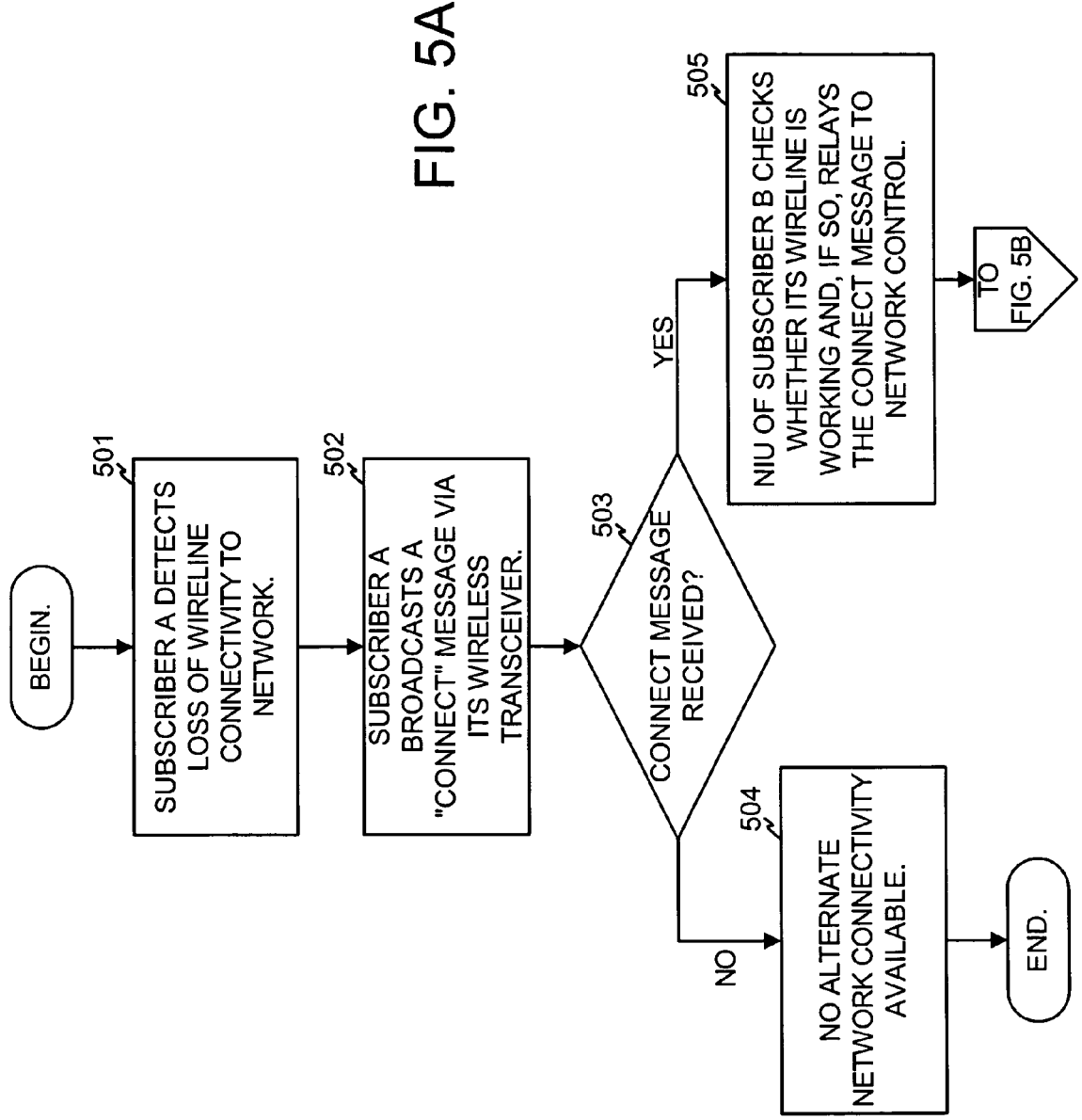

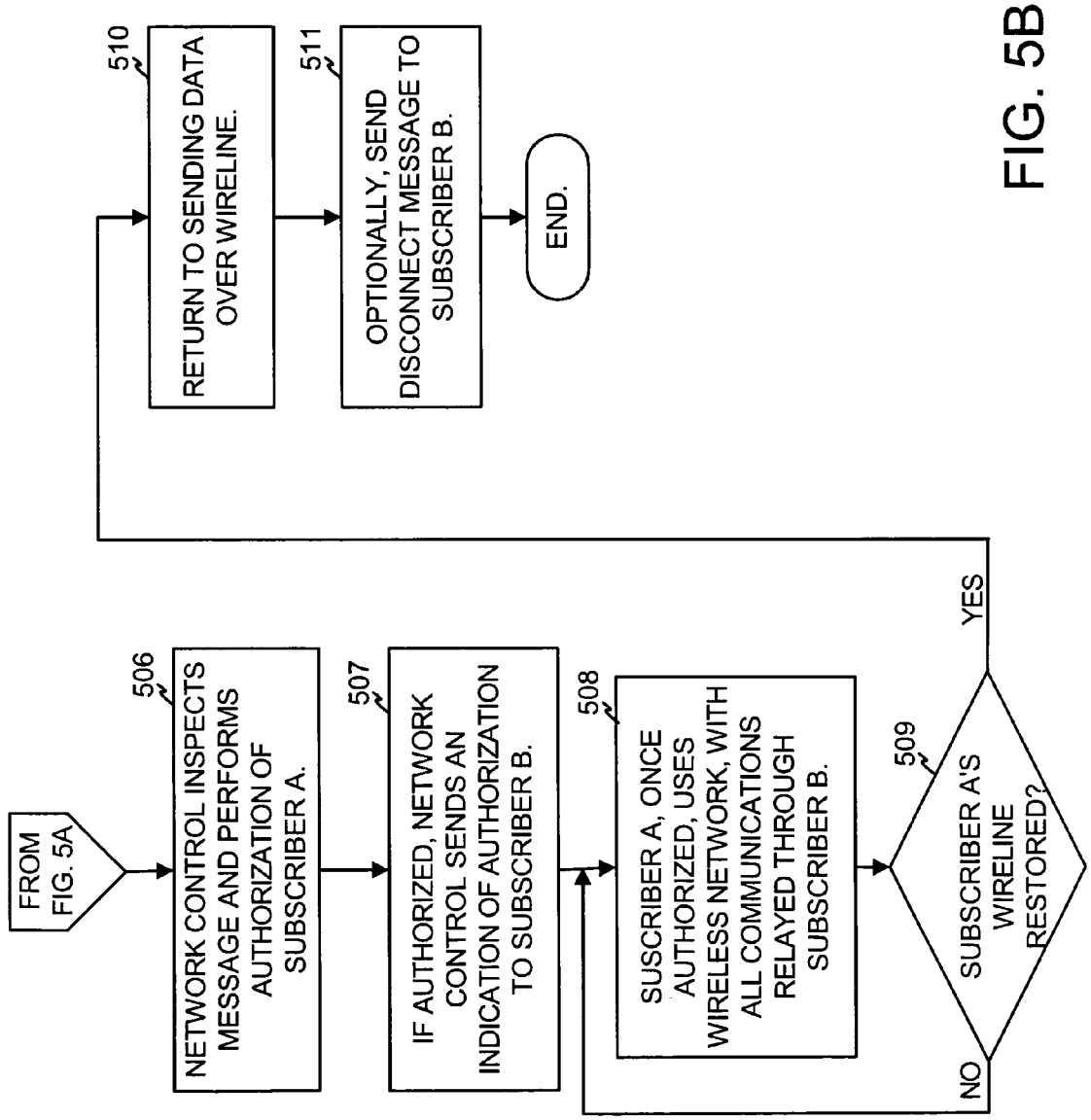

WIRELESS FALLBACK FOR SUBSCRIBERS OF WIRELINED NETWORKS

BACKGROUND OF THE INVENTION

A. Field of the Invention

The present invention relates generally to network access, and more particularly, to backup network access using wireless networks.

B. Description of Related Art

Most consumers have some form of wirelined network leading into their home. Telephone lines, connected to the public switched telephone network (PSTN), are one such extremely common form of network connection. Such telephone lines have been traditionally used to carry circuit-switched voice data, but have more recently also been used to carry digital data via digital subscriber line (DSL) connections. In addition to telephone network connections, other wireline networks leading to the home, such as coaxial cable television connections, which typically carry television signals and/or digital data to the consumer, are also common.

More recently, some companies have started providing more advanced wireline connections to the consumer. Examples of these systems include Fiber to the Neighborhood (FTTN) or Fiber to the Home (FTTH) systems. These systems may use optical fiber for high bandwidth communications all the way to the consumer.

Any type of communication system is not 100% reliable. Service outages tend to occur. Service outages that occur due to problems (e.g., broken wires, equipment faults, etc.) near or in the subscriber's residence or place of business can be particularly bothersome to the consumer, as these problems will frequently require a technician to visit the building to correct the problem. This can be frustrating to the subscriber, who must often wait, without service, until the technician arrives to fix the problem.

Accordingly, there is a need in the art to increase reliability of network services.

SUMMARY OF THE INVENTION

An aspect of the invention is directed to a device for enabling network connectivity with a network service provider. The device includes a wireless transceiver, an antenna coupled to the wireless transceiver, and a switch coupled to the wireless transceiver and to a wireline network. The switch exchanges data with the network service provider over the wireline network during normal operation and exchanges data with the network service provider via the wireless transceiver when connectivity is lost on the wireline network.

A second aspect of the invention is directed to a method performed by a network subscriber. The method includes establishing connectivity to a network service provider over a wireline connection and monitoring the wireline connection for failure. The method further includes automatically establishing a connection to the network service provider over a wireless connection relayed via other network subscribers when the wireline connection fails.

Another aspect of the invention is directed to a method for providing fallback network connectivity to a network service provider. The method includes providing primary network connectivity over a wireline connection and providing backup network connectivity via a wireless network implemented over a plurality of network nodes located at residences of subscribers of the network service provider.

Yet another aspect of the invention is directed to a network comprising wireline connections to a plurality of subscribers and network interface units located at the plurality of subscribers. The NIUs each include a wireless transceiver configured to communicate with other NIUs and a switch coupled to the wireless transceiver and to one of the wireline connections, the switch providing data from the one of the wireline connections to a corresponding subscriber of the network during normal operation of the one of the wireline connections and the switch providing data from the wireless transceiver to the corresponding subscriber of the network when connectivity on the one of the wireline connections fail.

BRIEF DESCRIPTION OF THE DRAWINGS

The accompanying drawings, which are incorporated in and constitute a part of this specification, illustrate an embodiment of the invention and, together with the description, explain the invention. In the drawings, FIG. 1A is a diagram conceptually illustrating connections between subscribers and a network provider such as a telephone company;

FIG. 1B is a diagram conceptually illustrating connections between subscribers and a network provider such as a cable company;

FIGS. 2A and 2B are diagrams conceptually illustrating the effect of failures in the systems of FIGS. 1A and 1B, respectively;

FIGS. 5A and 5B are flow charts illustrating exemplary operations consistent with aspects of the invention when a subscriber loses wireline connectivity;

DETAILED DESCRIPTION

Figure 3A:
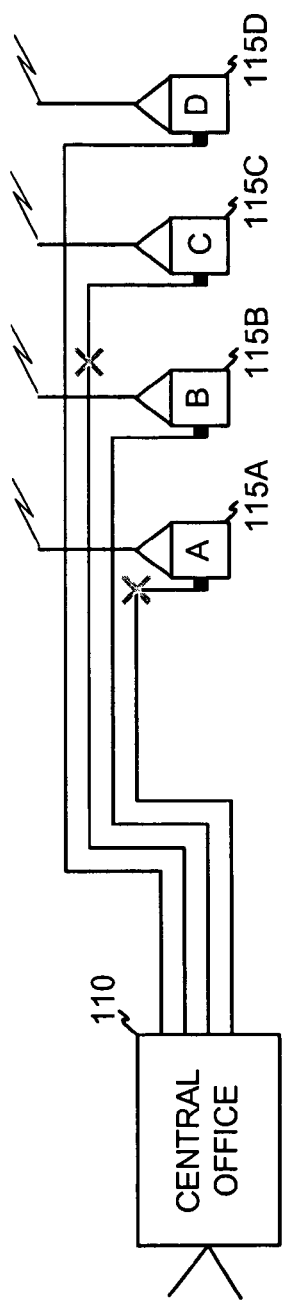
FIGS. 3A and 3B are diagrams conceptually illustrating implementations consistent with aspects of the invention.

The following detailed description of the invention refers to the accompanying drawings. The detailed description does not limit the invention.

As described herein, techniques are disclosed for implementing wireless fallback of wireline service. A wireless network may be implemented in a residential or business neighborhood. The wireless network may provide redundant network coverage to the network subscribers. In the event of a local wireline failure, the wireless network can provide backup connectivity to the subscribers.

System Overview

FIG. 1A is a diagram conceptually illustrating connections between subscribers (e.g., home or business customers) and a network provider such as a telephone company. Central office 110 may include switching equipment deployed locally to the subscribers being served, labeled as subscribers 115A, 115B, 115C, and 115D. At some point, wiring from central office 110 will include a single wire dedicated to each of subscribers 115.

FIG. 1B is a diagram conceptually illustrating connections between subscribers (e.g., home or business customers) and a network provider such as a cable company. A cable head-end unit 120 may connect to one or more neighborhood boxes 125 that provide a final wired connection to subscribers 130A, 130B, 130C, and 130D. Through cable head-end unit 120 and neighborhood boxes 125, subscribers may receive television and/or data services.

The telephone system illustrated in FIG. 1A and the cable system illustrated in FIG. 1B may be implemented as local distribution networks using a number of different technologies, such as conventional telephone systems, conventional cable systems, "next-generation" systems such as FTTN or FTTH systems, etc. Additionally, the cable system shown in FIG. 1B may additionally provide voice data services to its subscribers 130, such as voice services based on the Voice over IP (VoIP) protocol. Similarly, the telephone system shown in FIG. 1A could conceivably provide video services to its subscribers 115.

The individual wires shown in FIGS. 1A and 1B may be implemented as a number of different types of physical media, such as single mode fiber, multi-mode fiber, coaxial cable, twisted pair cable, etc. Each wire, however, connects a given subscriber 115/130 via a single path into the local distribution network.

FIGS. 2A and 2B are diagrams conceptually illustrating the effect of failures in the systems of FIGS. 1A and 1B, respectively. In general, if a path fails, for example, if a tree falls on the line leading to the subscriber, or equipment close to the subscriber fails, then the subscriber may lose all service. More specifically, as shown in FIG. 2A, a failure in the line leading to subscriber 115A (shown as an "X") disconnects this subscriber from the network. Similarly, a failure in the line leading to subscriber 115C disconnects this subscriber from the network. In FIG. 2B, A failure in the line leading to subscriber 130A disconnects this subscriber from the network. A failure in a common portion of the line shared by subscribers 130C and 130D disconnects both of these subscribers from the network.

Figure 3B:
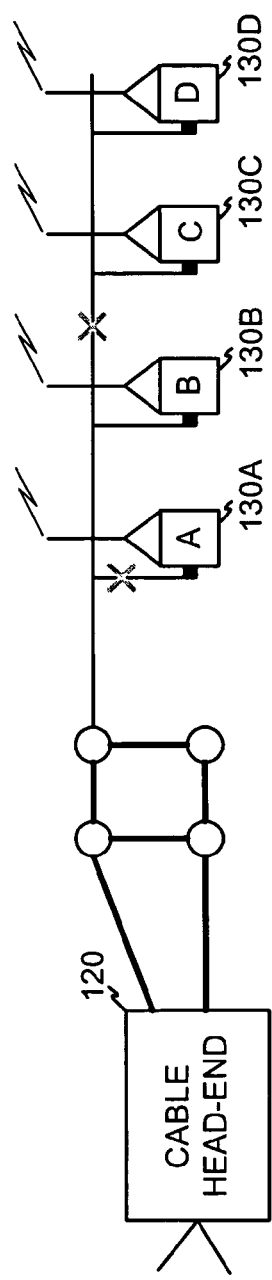

FIGS. 3A and 3B are diagrams conceptually illustrating implementations consistent with aspects of the invention. Subscribers 115 (FIG. 3A) and 130 (FIG. 3B) may be provided with wireless network interfaces, with which the subscribers can relay traffic until the traffic reaches a subscriber with a failed wireline. In FIG. 3A, for example, subscribers 115B and 115D are functioning normally and continue to receive data normally. These subscribers may wirelessly transmit and receive data to and from subscribers 115A and 115C, which are associated with failed wireline connections. Similarly, in FIG. 3B, subscribers 130A, 130C, and 130D may all continue to receive service through subscriber 130B. Even if subscriber 130D is out of direct range with subscriber 130B, it may still communicate with subscriber 130B via a wireless relay formed by subscriber 130C. In this manner, a local failure of the primary wireline network does not isolate the subscriber associated with the failed wireline.

Wireless Network Interface

Figure 4:
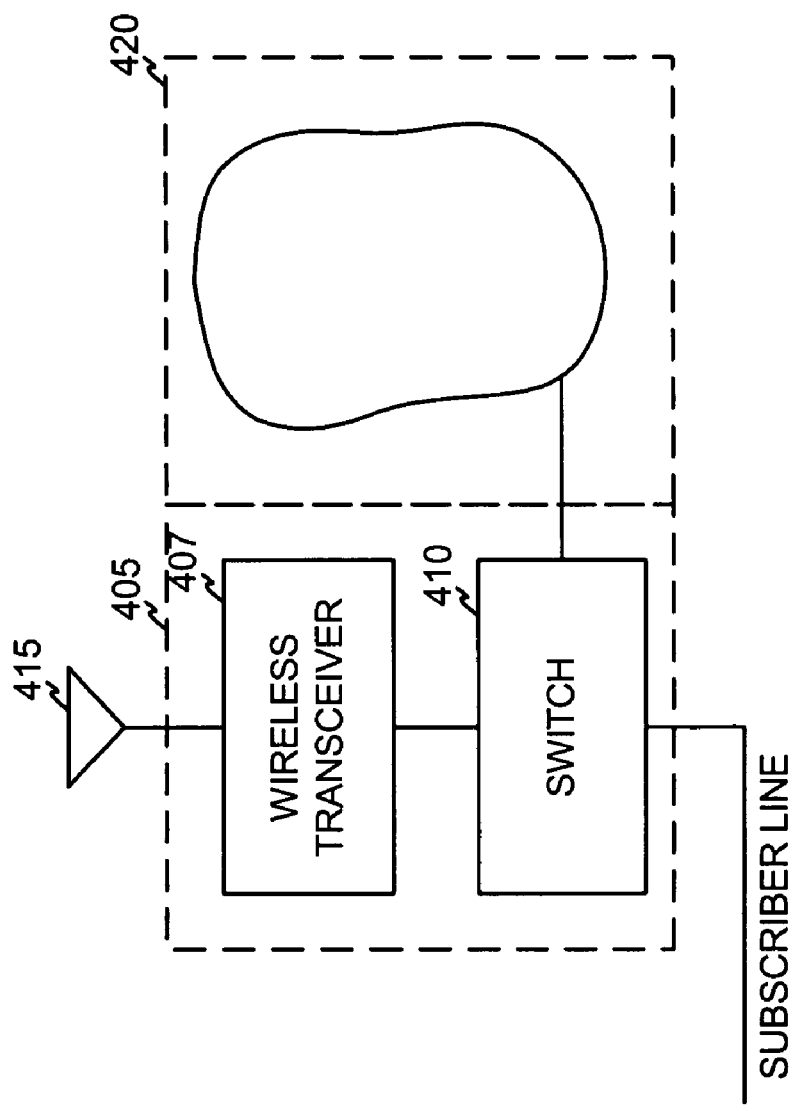
FIG. 4 is a diagram illustrating an exemplary implementation of a network interface installed at a subscriber location.

FIG. 4 is a diagram illustrating an exemplary implementation of a network interface installed at a subscriber location, illustrated as a network interface unit (NIU) 405. NIU 405 may include a wireless transceiver 407, a switch 410, and an antenna 415. Transceiver 407 and switch 410 may implement a wireless networking standard such the IEEE 802.11 standard. Switch 410 may be a packet switch that provides an interface between wireless transceiver 407, the subscriber's wired line, and a subscriber network 420.

Subscriber network 420 may include the subscriber's physical location, such as a home or business. In general, subscriber network 420 is used to illustrate the downstream portion of the network that is not owned by the service provider. For a residential environment, subscriber network 420 may include, for example, cables or wires leading inside the subscriber's house to one or more personal computers (or other computing devices). Subscriber network 420 can be defined similarly for a business environment, although business environments will typically include more computers arranged in a local area network within the business.

NIU 405 may be physically implemented as a small plastic box placed on the outside of the subscriber building (e.g., on the side of a home). NIU 405 may include a well defined space that acts as the legal demarcation between the service provider's portion of the network and the subscriber's portion (e.g., inside the building). In some implementations, NIUs 405 may also be placed as individual entities not connected to any subscriber. In this situation, the non-connected NIUs may function simply as wireless relays that extend the wireless coverage area of the other NIUs.

As previously mentioned, wireless transceiver 407 may be based on the IEEE 802.11 standards. In general, such transceivers are relatively cheap and have a range on the order of hundreds of feet. In many neighborhoods, this range is sufficient to reach one or more NIUs installed on neighboring buildings. The IEEE 802.11 standards, popularly know as Wi-Fi, include a number of well known high-frequency wireless transmission standards that specify Local Area Network (LAN) physical and data link layers. Wi-Fi uses the Ethernet protocol and CSMA/CA (carrier sense multiple access with collision avoidance) for shared medium access.

In some implementations, wireless transceiver 407 may be based on standards other than the IEEE 802.11 standard. In general, any wireless technology that allows peer-to-peer communications can be used. Possible examples of such other technologies include BlueTooth and Zigby. One skilled in the art will recognize, however, that other existing wireless technologies may be used. Such wireless technologies may operate in a number of frequency bands, such as 700 MHz band, ISM band, 2.4 GHz, or 5 GHz.

Switch 410 may be implemented via a standard microcomputer (CPU), a Digital signal Processor (DSP), a Field Programmable Gate Area (FPGA), an Application Specific Integrated Circuit (ASIC), or some combination of these techniques. In essence it acts as an ad-hoc router, knowing how to route packets one way or another depending on which way is currently best. In this implementation, switch 410, and more generally NIU 405, act as a node in an ad-hoc wireless network collectively formed by all the NIUs in an area. If the wireline connection is functioning properly, switch 410 will connect its subscriber via the wireline connection.

Switch 410 may act as an IP router (i.e. route packets based on their IP addresses), or an Ethernet Switch (route data frames based on their Ethernet addresses), or even an ATM switch (route packets based on their ATM Virtual Circuit Identifiers). More generally, switch 410 may be embodied as any form of packet router or switch. Typically, switch 410 would be implemented to be compatible with the switching/routing protocols used in the rest of the network. That is, one might perform Ethernet switching in those networks based on Ethernet techniques, or ATM switching in those local distribution networks based on ATM. Because wireless transceivers 407 may generally implement an ad-hoc wireless network, switch 410 may, in particular, include ad-hoc network routing functionality.

System Operation

FIGS. 5A and 5B are flow charts illustrating exemplary operations consistent with aspects of the invention when a subscriber loses wireline connectivity.

The NIU 405 of a particular subscriber, called subscriber "A" for this discussion, may detect the loss of the wireline (act 501) (FIG. 5A). This may be performed in a number of possible ways, such as by detecting the loss of a carrier signal, detecting the cessation of a periodic "heartbeat" message from the network, or expiration of a timer indicating that data is not being successfully conveyed between A and the network control (e.g., central office, cable head-end, etc).

In response to the loss of wireline connectivity, subscriber A may broadcast a "connect" message via wireless transceiver 407 and antenna 415 (act 502). The connect message broadcast may be implemented as an 802.11 RF broadcast so that any other wireless transceiver in range may hear it. Since all NIUs 405 may be running their wireless transceivers at all times, it may be received by any other NIU within range. If no other NIUs 405 receive the connect message, no alternate network connectivity is available (acts 503 and 504).

In normal operation, however, NIU 405 of another subscriber, called subscriber "B" for this discussion, will receive the connect message. In response, it may check whether its wireline connection is active (acts 503 and 505). If so, NIU 405 of subscriber B may relay the connect message, via its wireline connection, to network control, such as the central office or cable head-end (act 505). In one implementation, subscriber B may encapsulate the connect message from subscriber A (e.g., adds a 'B' header before the start of the message and/or a corresponding trailer at the end of the message) so that the network control knows which subscriber is acting as the relay.

The network control may inspect the relayed connect message and may interact with subscriber A to authenticate that subscriber A is a valid subscriber to the network (act 506, FIG. 5B). Both parties may employ subscriber B as a relay during the authentication. If the authorization is successful, the network control may return an indication of authorization to subscriber B (act 507).

It can be appreciated that the network control may receive multiple relayed connect messages from multiple subscribers that are located within range of subscriber A. In this situation, the network control may pick the one to act as the relay by, for example, selecting the first relay to respond.

Once authorized, the user at subscriber A may use the wireless network (although bandwidth may be reduced) (act 508). Packets generated by subscriber A are transmitted by subscriber A's wireless transceiver to the wireless transceiver of subscriber B. NIU 405 of subscriber B may then make a local decision whether to forward the packets received from subscriber A based on the authorization information received from the network control in Act 507.

Figure 6:
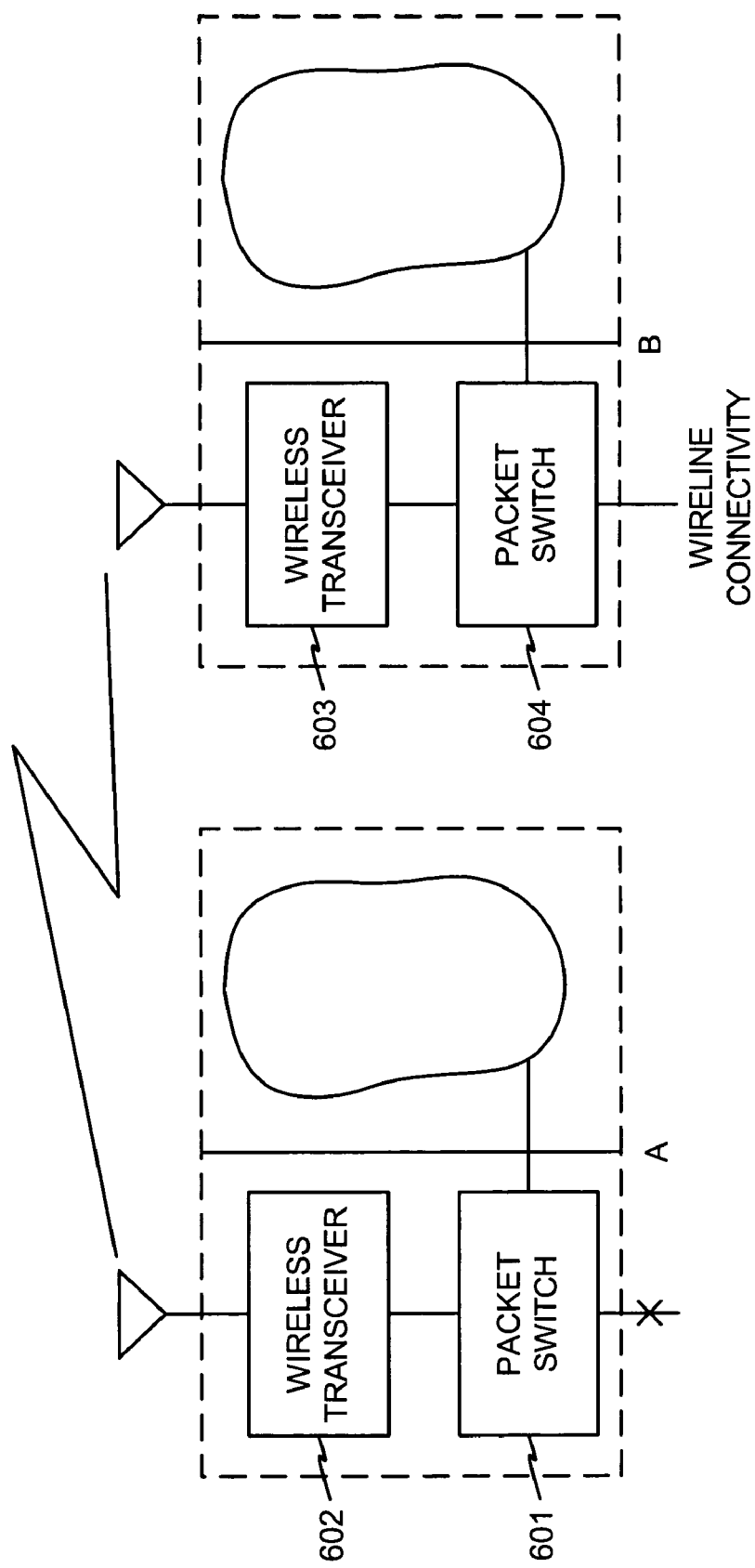
FIG. 6 is a diagram conceptually illustrating certain of the operations shown in FIGS. 5A and 5B.

FIG. 6 is a diagram conceptually illustrating the above-discussed operations of subscriber A and subscriber B. As shown in FIG. 6, subscriber A has lost wireline connectivity, as illustrated by the "X". In place of its wireline connectivity, subscriber A is receiving its network service via subscriber B. If one were to trace the route taken by a packet originating with subscriber A to the network, it can be seen that it follows this path: from subscriber A, to switch 601 at A, to wireless transceiver 602 at A, to wireless transceiver 603 at B, to switch 604 at B, to wireline connectivity at B. Packets in the reverse flow follow the reverse path.

Referring back to FIG. 5B, at some point, the wireline connection of subscriber A may be restored (act 509). Subscriber A may discover this fact using a number of possible techniques. For example, it may receive a carrier signal on its wireline connection, it may start receiving "heartbeat" packets from the network control on its wireline, etc. At this point, subscriber A may return to sending data via the wireline connection instead of its wireless connection to subscriber B (act 510). Optionally, subscriber A may send a disconnect message to subscriber B, so that subscriber B knows that it no longer needs to perform relaying functions for subscriber A (act 511).

Figure 7:
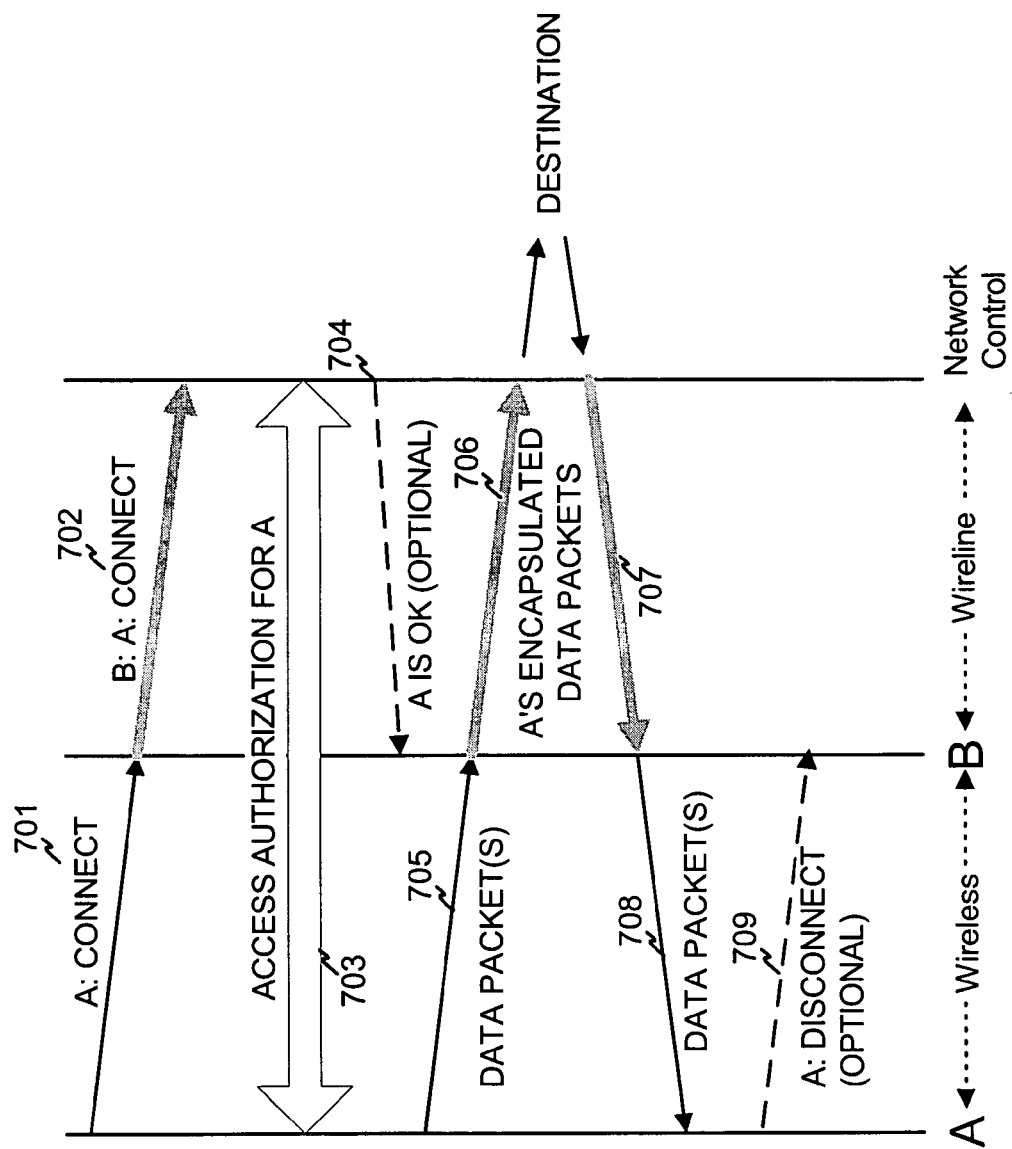
FIG. 7 is a diagram illustrating exemplary protocol interaction that may be used to implement the operations illustrated in FIGS. 5A and 5B.

FIG. 7 is a diagram illustrating exemplary protocol interaction that may be used to implement operations illustrated in FIG. 5. The first column in FIG. 7 represents the wireless connection between subscriber A and subscriber B and the second column in FIG. 7 represents the wireline connection between subscriber B and the network control.

Subscriber A may issue a connect message (message 701). Subscriber B relays the connect message to the network control (message 702). The network control and subscriber A may then exchange one or more messages (messages 703), relayed through subscriber B, to authorize subscriber A. Optionally, the network control may send a message to subscriber B indicating that subscriber A is authorized (message 704).

Once authorized, subscriber A may send data to, and receive data from, the network control. These messages, illustrated as messages 705-708, are relayed through subscriber B. Finally, subscriber A may disconnect from subscriber B, typically when wireline access is restored to subscriber A (message 709).

Multi-Hop Operation

The techniques described above with reference to FIGS. 3-7 have primarily been described as "one-hop" wireless relays. In a one-hop relay, the packet traverses the wireless channel only once in its path towards the network control center. However, in some situations, it may be necessary to perform multi-hop wireless forwarding.

Figure 8:
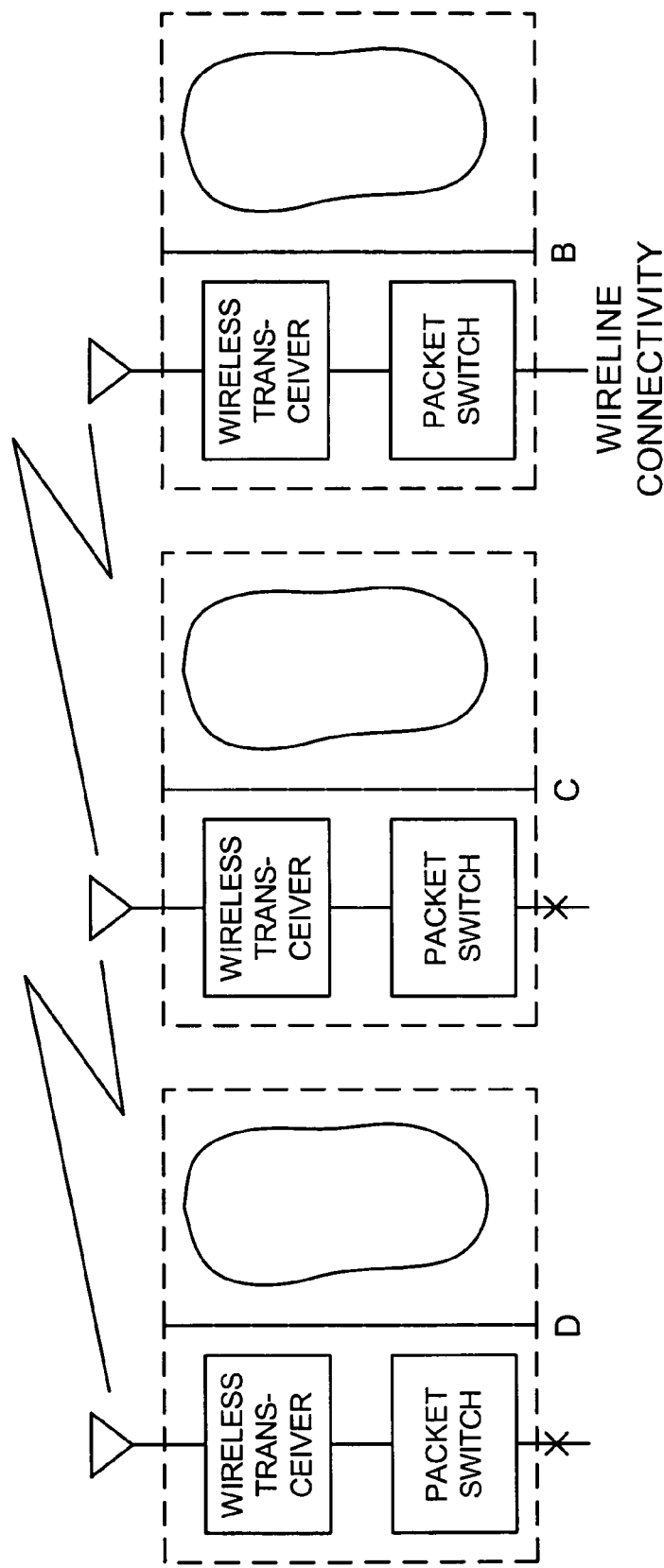
FIG. 8 is a diagram illustrating multi-hop network forwarding.

FIG. 8 is a diagram illustrating the concept of multi-hop network forwarding. As illustrated, both subscribers C and D have lost their wireline connection. Subscriber B, however, still has wireline connectivity. Assume subscriber C is within range for wireless connectivity to subscribers D and B, but subscribers B and D are not within range for direct wireless connectivity. In this situation, subscriber D may connect with subscriber B by relaying its wireless data through subscriber C. That is, subscriber C may forward packets it receives from subscriber D to subscriber B.

In general, subscribers B, C, and D may implement multi-hop network forwarding using a number of possible known multi-hop network routing techniques. Such techniques are known in the art and will not be described further herein.

Message Format

Figure 9A:
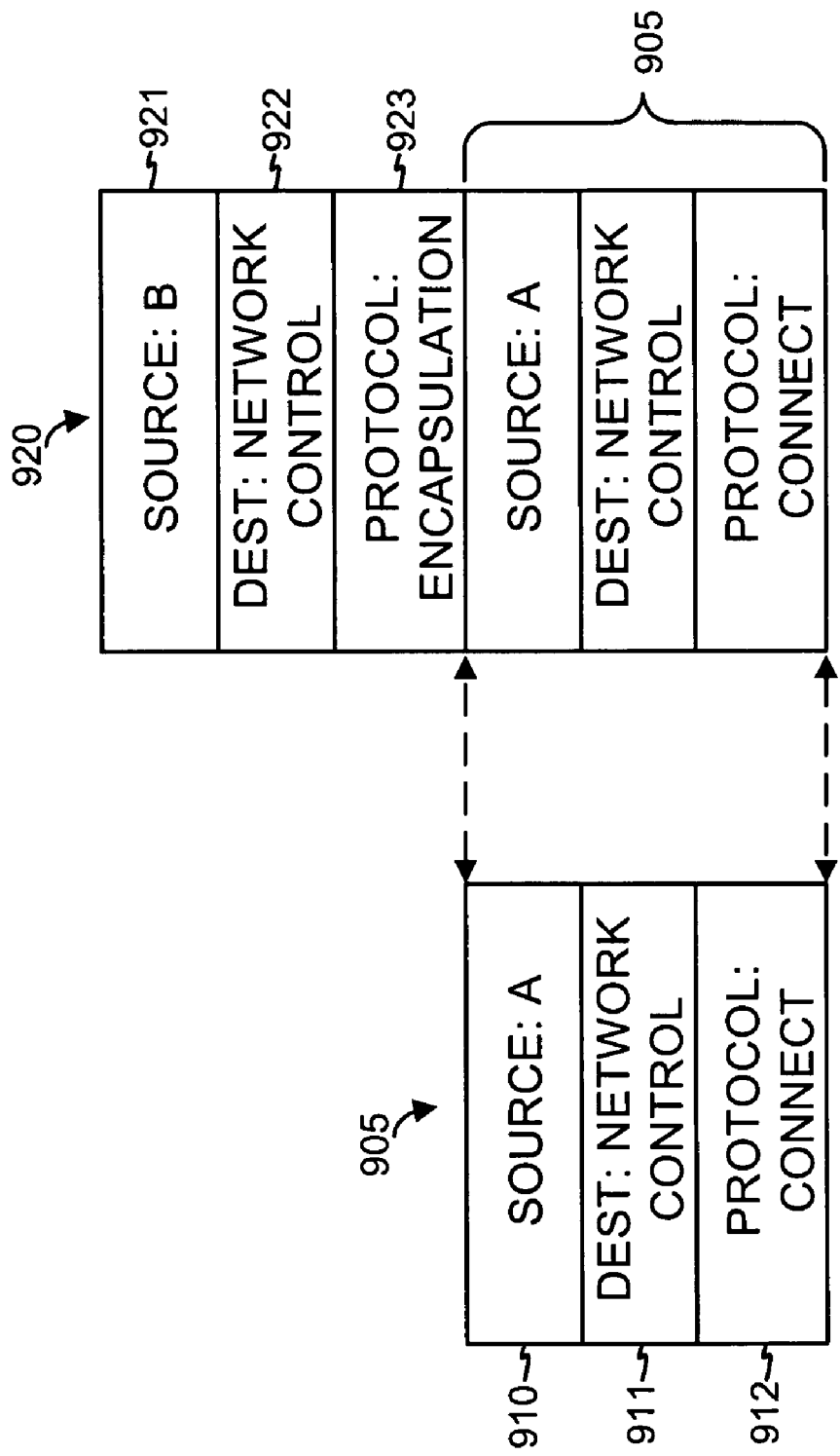
FIGS. 9A and 9B are diagrams illustrating an exemplary message encapsulation format consistent with aspects of the invention.
Figure 9B:
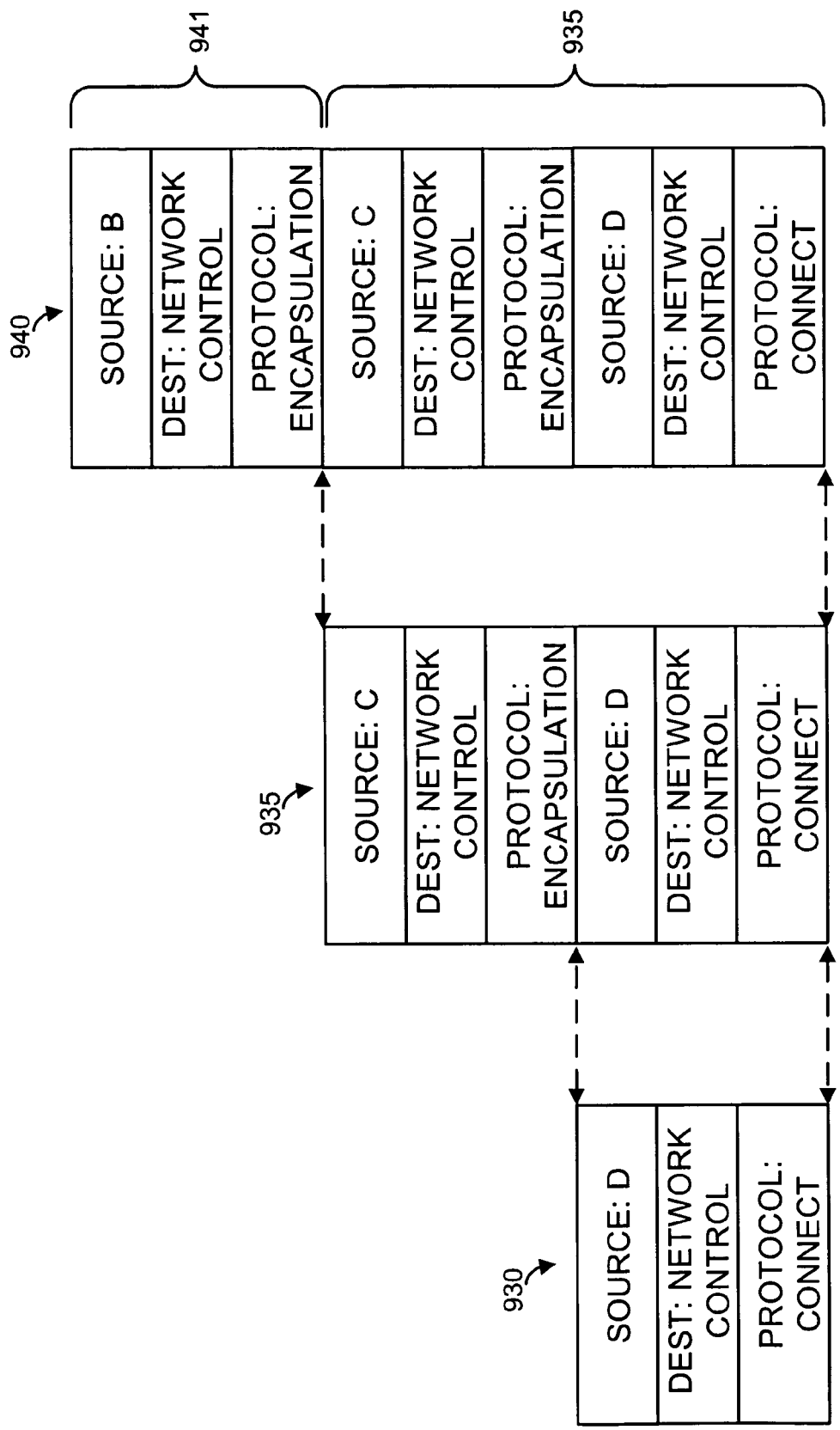

As previously mentioned, a relaying subscriber may encapsulate the message being relayed with its own message. FIGS. 9A and 9B are diagrams illustrating an exemplary message encapsulation format consistent with aspects of the invention. In this example, the message being relayed is the connect message.

As shown in FIG. 9A, a connect message 905 may include a source field 910, a destination field 911, and a protocol field 912. Source field 910 may include an indication of the subscriber sending the message (e.g., subscriber A). Destination field 911 may include an indication of the destination of the message (e.g., a network control center). Protocol field 912 may identify the message or protocol. In this example, protocol field 912 identifies the message as a connect message.

Message 920 illustrates message 905 after encapsulation by a relaying subscriber. Message 920 may include a source field 921, a destination field 922, and a protocol field 923. Source field 921 may be similar to source field 910, and includes an indication of the relaying subscriber (e.g., subscriber B). Destination field 922 may be similar to destination field 911, and may include an indication of the destination of the message. Protocol field 923 identifies the message as an "encapsulation message," meaning that that at least one additional message is associated with the message. As shown in FIG. 9A, the additional message may be a copy of message 905 appended after protocol field 923.

FIG. 9B illustrates an exemplary message encapsulation format for a multi-hop wireless transmission. An initial message 930, which may be similar to message 905, may be encapsulated, at the first hop, as message 935 in a manner similar to encapsulated message 920. At the second hop, message 935 may be further encapsulated into message 940, which includes message 935 appended to a new message portion 941. If there were additional hops, additional messages could be created and the previous version of the message appended to the newly created portion.

CONCLUSION

The concepts discussed above provide backup network access for wireline network failures that occur in the vicinity of the subscriber. Each subscriber in the network may be provided with a network interface unit that may form a wireless network with other nearby subscribers. The wireless network can then be used to provide the backup wireless network service to those of the subscribers with failing wireline connections.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the invention is not limiting of the invention. Thus, the operation and behavior of the aspects were described without reference to the specific software code or hardware logic. It should be understood that a person of ordinary skill in the art would be able to design software and control hardware to implement the aspects of the invention based on the description herein.

The foregoing description of preferred embodiments of the invention provides illustration and description, but is not intended to be exhaustive or to limit the invention to the precise form disclosed. Modifications and variations are possible in light of the above teachings or may be acquired from practice of the invention. For example although the above networks were described as transmitting messages and packets, more generally, networks can transmit or operate on data units other than these.

No element, act, or instruction used in the present application should be construed as critical or essential to the invention unless explicitly described as such. Also, as used herein, the article "a" is intended to potentially allow for one or more items. Further, the phrase "based on" is intended to mean "based, at least in part, on" unless explicitly stated otherwise. The scope of the invention is defined by the claims and their equivalents.

The scope of the invention is defined by the claims and their equivalents.

What is claimed:

1. A device, connected to and interfacing with a subscriber network within a subscriber location, said device enabling network connectivity of said subscriber with a network service provider, the device comprising:

a wireless transceiver;

an antenna coupled to the wireless transceiver; and a switch interfacing with said subscriber network, said switch being coupled to the wireless transceiver and to a wireline network, the switch exchanging data between said interfaced subscriber network and the network service provider over the wireline network during normal operation and also exchanging data with the network service provider via the wireless transceiver when connectivity is lost on the wireline network;

wherein the wireless transceiver is configured to relay data from another wireless transceiver interfacing with another subscriber network that has lost said connectivity to the wireline network due to a problem in a residence or place of business of a network subscriber associated with said another subscriber network, said another wireless transceiver being connected to said wireless transceiver through no more than one other wireless transceiver interfacing with one other subscriber network that has also lost said connectivity to the wireline network when said data is being relayed, said another and said one other wireless transceivers having been wireline-connected to the wireline network during normal operation, said data relay being accomplished by receiving a connect message from said another wireless transceiver at said no more than one other wireless transceiver;

encapsulating the connect message within a message addressed from said no more than one other wireless transceiver and transmitting the encapsulated connect message from the no more than one other wireless transceiver to the wireless transceiver;

encapsulating the encapsulated connect message within a message addressed from the wireless transceiver and transmitting the further-encapsulated connect message from the wireless transceiver over the wireline network to a network control;

receiving an indication of authorization at the wireless transceiver and at the no more than one other wireless transceiver;

receiving data packets from said another wireless transceiver at the no more than one other wireless transceiver; and based on the indication of authorization, forwarding the data packets between said no more than one other wireless transceiver to the wireless transceiver and from the wireless transceiver to the wireline network.

2. The device of claim 1, wherein the wireless transceiver relays the data from the other wireless transceivers that have lost connectivity by forwarding data units received from the other wireless transceivers through the switch and to the wireline network.

3. The device of claim 1, wherein the device is physically located at a location of a subscriber of the network service provider.

4. The device of claim 1, wherein the wireless transceiver operates in accordance with IEEE 802.11 standards.

5. The device of claim 1, wherein the wireline network includes a fiber network.

6. The device of claim 1, wherein the wireline network includes coaxial cables.

7. The device of claim 1, wherein the switch monitors a failed connection state of the wireline network for renewed connectivity of the wireline network and resumes communication over the wireline network when the wireline connection is renewed.

8. A system comprising:
a first wireline connection to a first subscriber location having a first subscriber network;
a first network interface unit (NIU) at the first subscriber location, the first NIU including:
    a first wireless transceiver; and
    a first switch coupled to the first wireless transceiver, the first wireline connection and the first subscriber network, the first switch providing data communications between the first wireline connection and the first subscriber network during normal operation of the first wireline connection and the first switch providing data communications between the first wireless transceiver and the first subscriber network when connectivity on the first wireline connections fails;
a second wireline connection to a second subscriber location having a second subscriber network, wherein the second subscriber location is remote from the first subscriber location; and
a second NIU at the second subscriber location, the second NIU including:
    a second wireless transceiver; and
    a second switch coupled to the second wireless transceiver, the second wireline connection and the second subscriber network, the second switch providing data communications between the second wireline connection and the second subscriber network during normal operation of the second wireline connection and the second switch providing data communications between the second wireless transceiver and the second subscriber network when connectivity on the second wireline connections fails;
wherein the second wireless transceiver is configured to relay data directly between the first wireless transceiver and the second wireline connection when the first wireline connection has failed by:
    receiving a connect message from the first NIU at the second NIU;
    encapsulating the connect message within a message addressed from the second NIU and transmitting the encapsulated connect message over the second wireline connection to a network control;
    receiving an indication of authorization at the second NIU;
    receiving data packets from the first wireless transceiver at the second NIU; and
    based on the indication of authorization, forwarding the data packets over the second wireline connection.

9. The system of claim 8, wherein relaying data over the second wireline connection further includes:
    determining whether the second wireline connection is operational;
    performing the forwarding of data packets when the second wireline connection is determined to be operational.

10. The system of claim 8, wherein relaying data over the second wireline connection further includes:
    receiving a disconnect message from the first NIU at the second NIU;
    ending the relaying based on the disconnect message.

11. The system of claim 8, wherein the first wireless transceiver and second wireless transceiver operate in accordance with IEEE 802.11 standards.

12. The system of claim 8, wherein the first wireline connection and the second wireline connection include at least one of a fiber optic cable and a coaxial cable.

13. The system of claim 8, wherein the first NIU monitors a connection state of the first wireline connection, and resumes communication over the first wireline connection when the first wireline connection is restored.

14. A system comprising:
a first wireline connection to a first subscriber location having a first subscriber network;
a first network interface unit (NIU) at the first subscriber location, the first NIU including:
    a first wireless transceiver; and
    a first switch coupled to the first wireless transceiver, the first wireline connection and the first subscriber network, the first switch providing data communications between the first wireline connection and the first subscriber network during normal operation of the first wireline connection and the first switch providing data communications between the first wireless transceiver and the first subscriber network when connectivity on the first wireline connections fails;
a second wireline connection to a second subscriber location having a second subscriber network, wherein the second subscriber location is remote from the first subscriber location;
a second NIU at the second subscriber location, the second NIU including:
    a second wireless transceiver; and
    a second switch coupled to the second wireless transceiver, the second wireline connection and the second subscriber network, the second switch providing data communications between the second wireline connection and the second subscriber network during normal operation of the second wireline connection and the second switch providing data communications between the second wireless transceiver and the second subscriber network when connectivity on the second wireline connections fails;
a third wireline connection to a third subscriber location having a third subscriber network, wherein the third subscriber location is remote from both the first subscriber location and the second subscriber location;
a third NIU at the third subscriber location, the third NIU including:
    a third wireless transceiver; and
    a third switch coupled to the third wireless transceiver, the third wireline connection and the third subscriber network, the third switch providing data communications between the third wireline connection and the third subscriber network during normal operation of the third wireline connection and the third switch providing data communications between the third wireless transceiver and the third subscriber network when connectivity on the third wireline connections fails;
wherein the second NIU is configured to relay first subscriber network data directly between the first wireless transceiver and the second wireless transceiver when the first wireline connection has failed, and wherein the third NIU is configured to relay second subscriber network data and said first subscriber network data directly between the second wireless transceiver and the third wireline connection when the second wireline connection also has failed, and wherein relaying said data over the second wireline connection includes:
receiving a connect message from the first NIU at the second NIU;
encapsulating the connect message within a message addressed from the second NIU and transmitting the encapsulated connect message from the second wireless transceiver to the third wireless transceiver;
receiving an indication of authorization at the second NIU;
receiving data packets from the first wireless transceiver at the second NIU; and
based on the indication of authorization, forwarding the data packets between the second wireless transceiver and the third wireless transceiver; and wherein relaying said data over the third wireline connection includes:
receiving the encapsulated connect message from the second NIU at the third NIU;
encapsulating the encapsulated connect message within a message addressed from the third NIU and transmitting the further-encapsulated connect message from the third NIU over the third wireline connection to a network control.

15. The system of claim 14, wherein relaying said data between the second wireless transceiver and the third wireless transceiver further includes:
determining by the second NIU whether the second wireline connection is operational;
performing the forwarding of data packets between the second wireless transceiver and the third wireless transceiver when the second wireline connection is determined to have failed.

16. The system of claim 14, wherein relaying said data between the second wireless transceiver and the third wireless transceiver further includes:
receiving a disconnect message from the first NIU at the second NIU;
ending the relaying based on the disconnect message.

17. The system of claim 14, wherein the first wireless transceiver, second wireless transceiver and third wireless transceiver operate in accordance with IEEE 802.11 standards.

18. The system of claim 14, wherein the first wireline connection, the second wireline connection and the third wireline connection include at least one of a fiber optic cable and a coaxial cable.

19. The system of claim 14, wherein the first NIU monitors a connection state of the first wireline connection, and resumes communication over the first wireline connection when the first wireline connection is restored.

20. A method comprising:
providing a first wireline connection to a first subscriber location having a first subscriber network;
providing a first network interface unit (NIU) at the first subscriber location, the first NIU including:
a first wireless transceiver; and
a first switch coupled to the first wireless transceiver, the first wireline connection and the first subscriber network, the first switch providing data communications between the first wireline connection and the first subscriber network during normal operation of the first wireline connection and the first switch providing data communications between the first wireless transceiver and the first subscriber network when connectivity on the first wireline connections fails;
providing a second wireline connection to a second subscriber location having a second subscriber network, wherein the second subscriber location is remote from the first subscriber location; and
providing a second NIU at the second subscriber location, the second NIU including:
a second wireless transceiver; and
a second switch coupled to the second wireless transceiver, the second wireline connection and the second subscriber network, the second switch providing data communications between the second wireline connection and the second subscriber network during normal operation of the second wireline connection and the second switch providing data communications between the second wireless transceiver and the second subscriber network when connectivity on the second wireline connections fails;

wherein the second wireless transceiver is configured to relay data directly between the first wireless transceiver and the second wireline connection when the first wireline connection has failed by:
receiving a connect message from the first NIU at the second NIU;
encapsulating the connect message within a message addressed from the second NIU and transmitting the encapsulated connect message over the second wireline connection to a network control;
receiving an indication of authorization at the second NIU;
receiving data packets from the first wireless transceiver at the second NIU; and
based on the indication of authorization, forwarding the data packets over the second wireline connection.

21. A network, comprising:
a plurality of network interface units serviced by a network service provider, each one of said units interfacing with its respective subscriber network, said each one of said units including a wireless transceiver configured to wirelessly communicate with other of said units, said each one of said units being normally wireline-connected to said service provider via a switch in said unit;
wherein said switch couples said transceiver and said subscriber network to said service provider when said service provider is wireline connected to said unit and said switch couples said transceiver to said subscriber network when said service provider is not wireline connected to said unit; and
wherein a first one of said units which is not wireline connected to said service provider is both wirelessly and wireline connected to said service provider by way of a wireless connection to a second one of said units, said second one of said units having said normal wireline connection to said service provider; and
wherein data is relayed between said first one of said units and said network service provider by:
receiving a connect message from said first one of said units at said second one of said units;
encapsulating said connect message within a message addressed from said second one of said units and transmitting said encapsulated connect message over said normal wireline connection to a network control of said network service provider;
receiving an indication of authorization at said second one of said units;

receiving data packets from said wireless transceiver of said first one of said units at said second one of said units; and based on said indication of authorization, forwarding said data packets over said normal wireline connection to said network service provider.

22. The network of claim 21 wherein said wireless connection to said second one of said units comprises an intermediate one of said plurality of network interface units which is not wireline connected to said service provider and which is wirelessly connected to both said first one of said units and said second one of said units.

23. The network of claim 22 wherein data derived from, or destined for, said subscriber network associated with said first one of said units and/or data derived from, or destined for, said subscriber network associated with said intermediate one of said units is wireline-transmitted to, or from, respectively, said service provider via said second one of said units.

24. A method, comprising:

providing a plurality of network interface units serviced by a network service provider, each one of said units interfacing with its respective subscriber network, said each one of said units including a wireless transceiver configured to wirelessly communicate with other of said units, said each one of said units being normally wireline-connected to said service provider via a switch in said unit;

wherein said switch couples said transceiver and said subscriber network to said service provider when said service provider is wireline connected to said unit and said switch couples said transceiver to said subscriber network when said service provider is not wireline connected to said unit; and wherein a first one of said units which is not wireline connected to said service provider is both wirelessly and wireline connected to said service provider by way of a wireless connection to a second one of said units, said second one of said units having said normal wireline connection to said service provider; and wherein data is relayed between said first one of said units and said network service provider by:

receiving a connect message from said first one of said units at said second one of said units;

encapsulating said connect message within a message addressed from said second one of said units and transmitting said encapsulated connect message over said normal wireline connection to a network control of said network service provider;

receiving an indication of authorization at said second one of said units;

receiving data packets from said wireless transceiver of said first one of said units at said second one of said units; and based on said indication of authorization, forwarding said data packets over said normal wireline connection to said network service provider.

25. A method, comprising:

detecting, by a first subscriber of a network, loss of a wireline connection between said first network subscriber and said network;

broadcasting a connect message via a wireless transceiver of said first network subscriber, said connect message received by a wireless transceiver of a second subscriber of said network;

if said second network subscriber has a wireline connection to said network, relaying said connect message to network control of a network service provider of said network via said second subscriber wireline connection by encapsulating said connect message within a message addressed from said second subscriber and transmitting said encapsulated connect message over said second subscriber wireline connection to said network control; and said second network subscriber forwarding data packets wirelessly received from said first network subscriber to said network service provider over said second subscriber wireline connection provided that said second network subscriber previously received an indication of authorization of said first network subscriber from said network control in response to said encapsulated connect message.

26. The method of claim 25 wherein said second network subscriber does not have said second subscriber wireline connection, said method further comprising:

broadcasting a second connect message via a wireless transceiver of said second network subscriber, said second connect message received by a wireless transceiver of a third subscriber of said network;

if said third network subscriber has a wireline connection to said network, relaying said second connect message and said connect message to network control of a network service provider of said network via said third subscriber wireline connection by encapsulating both said second connect message and said encapsulated connect message within a message thereby obtaining a further encapsulated message, said further encapsulated message being addressed from said third subscriber and transmitting said further encapsulated message over said third subscriber wireline connection to said network control; and said third network subscriber forwarding data packets wirelessly received from said first network subscriber and said second network subscriber to said network service provider over said third subscriber wireline connection provided that said third network subscriber previously received an indication of authorization of both said first network subscriber and said second network subscriber from said network control in response to said further encapsulated connect message.

27. A system, comprising:

first system component for detecting, by a first subscriber of a network, loss of a wireline connection between said first network subscriber and said network;

second system component for broadcasting a connect message via a wireless transceiver of said first network subscriber, said connect message received by a wireless transceiver of a second subscriber of said network;

if said second network subscriber has a wireline connection to said network, third system component for relaying said connect message to network control of a network service provider of said network via said second subscriber wireline connection by encapsulating said connect message within a message addressed from said second subscriber and transmitting said encapsulated connect message over said second subscriber wireline connection to said network control; and fourth system component for permitting said second network subscriber to forward data packets wirelessly received from said first network subscriber to said network service provider over said second subscriber wireline connection provided that said second network subscriber previously received an indication of authorization of said first network subscriber from said network control in response to said encapsulated connect message.

28. The system of claim 27 wherein said second network subscriber does not have said second subscriber wireline connection, said system further comprising:
  fifth system component for broadcasting a second connect message via a wireless transceiver of said second network subscriber, said second connect message received by a wireless transceiver of a third subscriber of said network;
  if said third network subscriber has a wireline connection to said network, sixth system component for relaying said second connect message and said connect message to network control of a network service provider of said network via said third subscriber wireline connection by encapsulating both said second connect message and said encapsulated connect message within a message thereby obtaining a further encapsulated message, said further encapsulated message being addressed from said third subscriber and transmitting said further encapsulated message over said third subscriber wireline connection to said network control; and
  seventh system component for permitting said third network subscriber to forward data packets wirelessly received from said first network subscriber and said second network subscriber to said network service provider over said third subscriber wireline connection provided that said third network subscriber previously received an indication of authorization of both said first network subscriber and said second network subscriber from said network control in response to said further encapsulated connect message.

29. Apparatus, comprising:
  means for detecting loss of a wireline connection between a first network subscriber and said network;
  means for broadcasting a connect message via a wireless transceiver of said first network subscriber, said connect message received by a wireless transceiver of a second subscriber of said network;
  if said second network subscriber has a wireline connection to said network,
  means for relaying said connect message to network control of a network service provider of said network via said second subscriber wireline connection by encapsulating said connect message within a message addressed from said second subscriber and transmitting said encapsulated connect message over said second subscriber wireline connection to said network control; and
  means for permitting said second network subscriber to forward data packets wirelessly received from said first network subscriber to said network service provider over said second subscriber wireline connection provided that said network subscriber previously received an indication of authorization of said first network subscriber from said network control in response to said encapsulated connect message.

30. The apparatus of claim 29 wherein said second network subscriber does not have said second subscriber wireline connection, said method further comprising;
  means for broadcasting a second connect message via a wireless transceiver of said second network subscriber, said second connect message received by a wireless transceiver of a third subscriber of said network;
  if said third network subscriber has a wireline connection to said network,
  means for relaying said connect message to network control of a network service provider of said network via said third subscriber wireline connection by encapsulating both said second connect message and said encapsulated connect message within a message thereby obtaining a further encapsulated message, aid further encapsulated message being addressed from said third subscriber and transmitting said further encapsulated message over said third subscriber wireline connection to said network control; and
  means for permitting said third network subscriber to forward data packets wirelessly received from said first network subscriber and said second network subscriber to said network service provider over said third subscriber wireline connection provided that said third network subscriber previously received an indication of authorization of said both first network subscriber and said second network subscriber from said network control in response to said further encapsulated connect message.

* * * * *